United States Patent
Kim et al.

(10) Patent No.: US 9,761,865 B2
(45) Date of Patent: Sep. 12, 2017

(54) ELECTRODE ASSEMBLY FOR SECONDARY BATTERIES AND LITHIUM SECONDARY BATTERY INCLUDING THE SAME

(71) Applicant: LG CHEM, LTD., Seoul (KR)

(72) Inventors: Soo Jung Kim, Daejeon (KR); Jae Bin Chung, Daejeon (KR); Byung O Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 275 days.

(21) Appl. No.: 14/573,507

(22) Filed: Dec. 17, 2014

(65) Prior Publication Data

US 2015/0104704 A1 Apr. 16, 2015

Related U.S. Application Data

(63) Continuation of application No. PCT/KR2013/006959, filed on Aug. 1, 2013.

(30) Foreign Application Priority Data

Aug. 1, 2012 (KR) .................. 10-2012-0084470

(51) Int. Cl.
*H01M 10/052* (2010.01)
*H01M 4/131* (2010.01)
(Continued)

(52) U.S. Cl.
CPC ........... *H01M 4/131* (2013.01); *H01M 4/133* (2013.01); *H01M 4/134* (2013.01); *H01M 4/366* (2013.01);
(Continued)

(58) Field of Classification Search
CPC .................. H01M 10/052; H01M 10/0525
See application file for complete search history.

(56) References Cited

U.S. PATENT DOCUMENTS

2002/0061443 A1 5/2002 Nakanishi et al.
2003/0129494 A1 7/2003 Kaneda et al.
(Continued)

FOREIGN PATENT DOCUMENTS

CN 102163717 A 8/2011
JP 8-264183 A 10/1996
(Continued)

OTHER PUBLICATIONS

International Search Report, issued in PCT/KR2013/006959, dated Nov. 5, 2013.

*Primary Examiner* — Olatunji Godo
(74) *Attorney, Agent, or Firm* — Birch, Stewart, Kolasch & Birch, LLP

(57) ABSTRACT

Disclosed are an electrode assembly for secondary batteries and a lithium secondary battery including the same. More particularly, an electrode assembly including a cathode, an anode and a separator, wherein the cathode includes a lithium cobalt-based oxide, and a lithium nickel-based composite oxide forming a coating layer over a surface of the lithium nickel-based composite oxide by reacting with a fluorine-containing polymer, as a cathode active material, the anode includes carbon and a silicon oxide as an anode active material, an operating voltage is 2.50 V to 4.35 V, and the cathode active material has high rolling density by a bimodal form in which an average diameter of the cobalt-based oxide and an average diameter of the lithium nickel-based composite oxide are different, and a lithium secondary battery including the same are disclosed. In addition, an electrode assembly including a lithium cobalt-based oxide surface-coated with alumina ($Al_2O_3$), and a lithium secondary battery including the same are disclosed.

21 Claims, 3 Drawing Sheets

(51) Int. Cl.

| | | |
|---|---|---|
| *H01M 4/505* | (2010.01) | |
| *H01M 4/525* | (2010.01) | |
| *H01M 4/133* | (2010.01) | |
| *H01M 4/134* | (2010.01) | |
| *H01M 4/36* | (2006.01) | |
| *H01M 4/38* | (2006.01) | |
| *H01M 4/587* | (2010.01) | |
| *H01M 4/62* | (2006.01) | |
| *H01M 10/0525* | (2010.01) | |

(52) U.S. Cl.
CPC ........... *H01M 4/386* (2013.01); *H01M 4/505* (2013.01); *H01M 4/525* (2013.01); *H01M 4/587* (2013.01); *H01M 4/623* (2013.01); *H01M 10/052* (2013.01); *H01M 10/0525* (2013.01); *H01M 2220/20* (2013.01); *H01M 2220/30* (2013.01); *Y02T 10/7011* (2013.01)

(56) References Cited

U.S. PATENT DOCUMENTS

| | | | |
|---|---|---|---|
| 2004/0053135 A1 | 3/2004 | Matsumoto et al. | |
| 2005/0271943 A1 | 12/2005 | Park et al. | |
| 2006/0093920 A1* | 5/2006 | Cheon | H01M 4/131 429/232 |
| 2006/0204845 A1* | 9/2006 | Chang | H01M 4/364 429/209 |
| 2006/0257745 A1 | 11/2006 | Choi et al. | |
| 2008/0241693 A1* | 10/2008 | Fukuchi | C01G 45/006 429/231.1 |
| 2009/0087731 A1 | 4/2009 | Fukui et al. | |
| 2009/0194747 A1* | 8/2009 | Zou | H01M 4/131 252/519.33 |
| 2009/0233176 A1 | 9/2009 | Kita et al. | |
| 2010/0119947 A1* | 5/2010 | Lee | H01M 4/0471 429/231.95 |
| 2010/0297508 A1* | 11/2010 | Lee | H01M 10/0567 429/324 |
| 2011/0052991 A1* | 3/2011 | Kim | C01G 53/50 429/231 |
| 2011/0076556 A1* | 3/2011 | Karthikeyan | H01M 4/366 429/188 |
| 2011/0175020 A1* | 7/2011 | Lee | H01M 4/049 252/182.1 |
| 2012/0156560 A1 | 6/2012 | Hong et al. | |
| 2012/0225345 A1* | 9/2012 | Kim | H01M 2/1653 429/145 |

FOREIGN PATENT DOCUMENTS

| | | |
|---|---|---|
| JP | 2000-243396 A | 9/2000 |
| JP | 2006-228733 A | 8/2006 |
| JP | 2008-21517 A | 1/2008 |
| JP | 2008-41502 A | 2/2008 |
| JP | 2008-198463 A | 8/2008 |
| KR | 2001-0042109 A | 5/2001 |
| KR | 2002-0025815 A | 4/2002 |
| KR | 10-2002-0091486 A | 12/2002 |
| KR | 10-2004-0026378 A | 3/2004 |
| KR | 10-2006-0091486 A | 8/2006 |
| KR | 10-2010-0131921 A | 12/2010 |
| WO | WO 2007/072759 A1 | 6/2007 |
| WO | WO 2011/054441 A1 | 5/2011 |
| WO | WO 2012/022618 A1 | 2/2012 |
| WO | WO2011126310 * | 3/2012 |

\* cited by examiner

[FIG. 1]
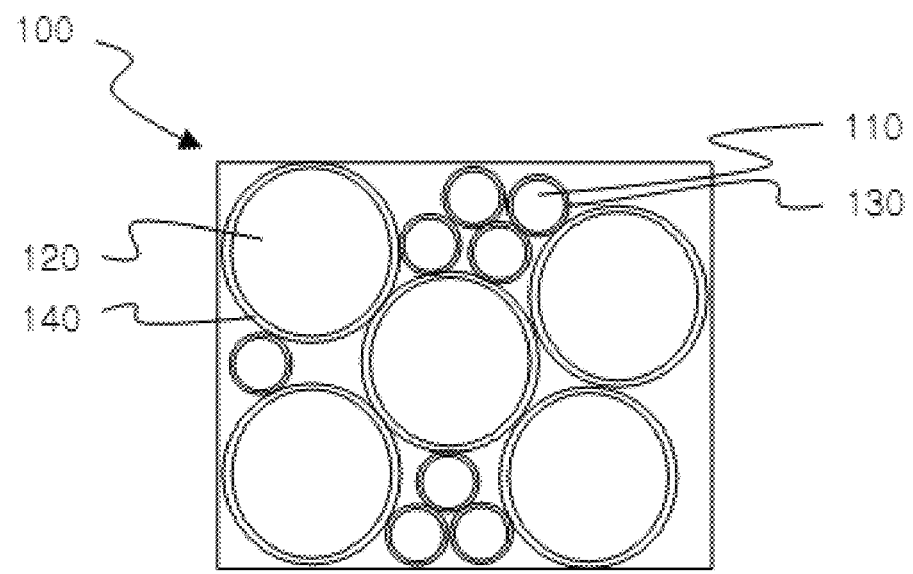
[FIG. 2]
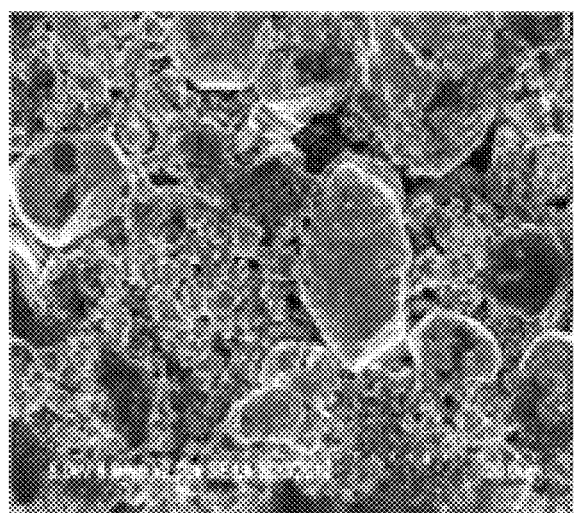

[FIG. 3]
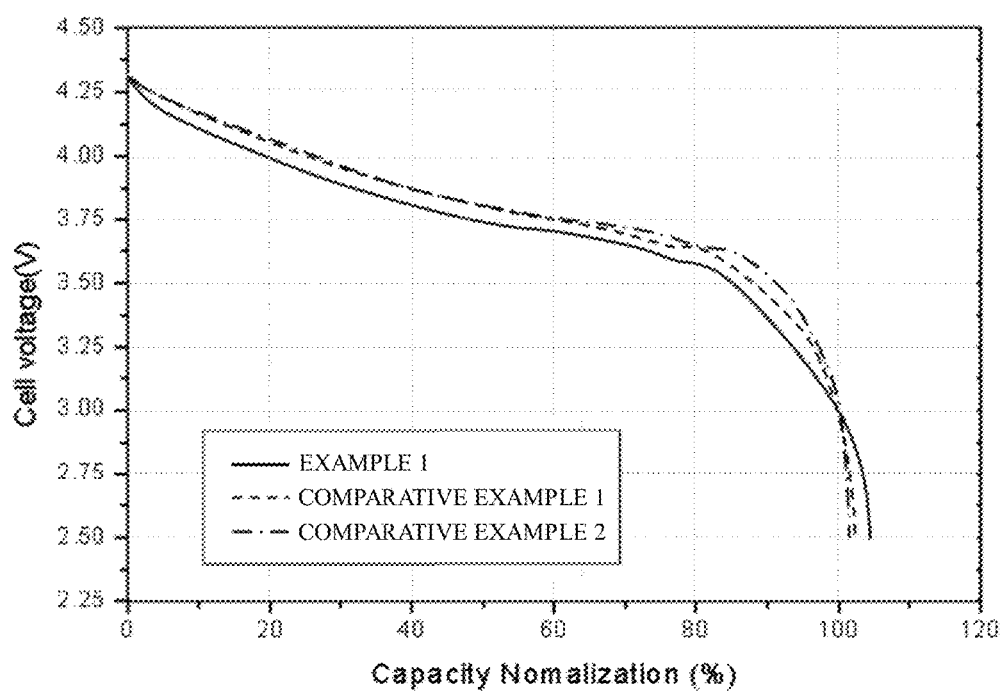

[FIG. 4]
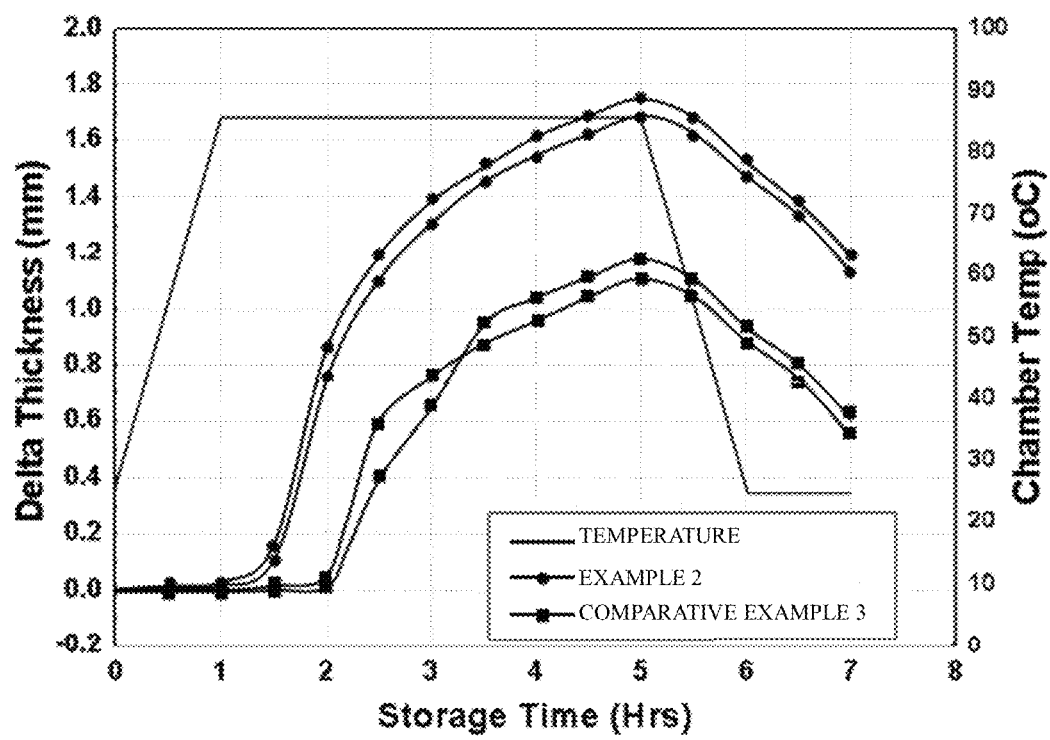

ELECTRODE ASSEMBLY FOR SECONDARY BATTERIES AND LITHIUM SECONDARY BATTERY INCLUDING THE SAME

CROSS REFERENCE TO RELATED APPLICATIONS

This application is Continuation of PCT International Application No. PCT/KR2013/006959, filed on Aug. 1, 2013, which claims priority under 35 U.S.C. 119(a) to Patent Application No. 10-2012-0084470, filed in the Republic of Korea on Aug. 1, 2012, all of which are hereby expressly incorporated by reference into the present application.

TECHNICAL FIELD

The present invention relates to an electrode assembly for secondary batteries and a lithium secondary battery including the same. More particularly, the present invention relates to an electrode assembly including a cathode, an anode and a separator, wherein the cathode includes a lithium cobalt-based oxide, and a lithium nickel-based composite oxide forming a coating layer over a surface of the lithium nickel-based composite oxide by reacting with a fluorine-containing polymer, as a cathode active material, the anode includes carbon and a silicon oxide as an anode active material, an operating voltage is 2.50 V to 4.35 V, and the cathode active material has high rolling density by a bimodal form in which an average diameter of the cobalt-based oxide and an average diameter of the lithium nickel-based composite oxide are different, and a lithium secondary battery including the same.

BACKGROUND ART

In secondary batteries, which have recently been increasingly used, a lithium-containing cobalt oxide ($LiCoO_2$) as a cathode active material is mainly used and, in addition, use of lithium-containing manganese oxides such as $LiMnO_2$ having a layered crystal structure, $LiMn_2O_4$ having a spinel crystal structure and the like, and a lithium-containing nickel oxide ($LiNiO_2$) is considered.

$LiCoO_2$ among the cathode active materials has excellent physical properties such as excellent cycle characteristics and thereby are broadly used. However, $LiCoO_2$ is relatively expensive and charge/discharge current capacity thereof is low, approximately 150 mAh/g. In addition, a crystal structure of $LiCoO_2$ is unstable at 4.3 V or more and thereby possesses a variety problems such as ignition due to reaction with an electrolyte.

Regarding this, technology for coating an outer surface of $LiCoO_2$ with a metal (aluminum or the like), technology for heat-treating $LiCoO_2$ or mixing $LiCoO_2$ with other materials, and the like, such that $LiCoO_2$ can operate at high voltage, have been suggested. Secondary batteries composed of such a cathode material are unstable at high voltage or are difficult to use in a manufacturing process.

Lithium manganese oxides, such as $LiMnO_2$, $LiMn_2O_4$, and the like, are advantageous in that they contain Mn that is abundant as a raw material and environmentally friendly and thus are drawing much attention as a cathode active material that can replace $LiCoO_2$. However, such lithium manganese oxides have low capacity and poor cycle properties.

Lithium nickel-based oxides such as $LiNiO_2$ and the like are less expensive than cobalt-based oxides and, when charged to 4.3 V, the lithium nickel-based oxides have high discharge capacity. Thus, reversible capacity of doped $LiNiO_2$ approximates to 200 mAh/g, which exceeds the capacity of $LiCoO_2$ (approximately 165 mAh/g). However, $LiNiO_2$-based oxides exhibit problems such as rapid phase transition of a crystal structure according to volumetric change through repeated charge/discharge, generation of a large amount of gas during cycling, and the like.

To address these problems, lithium transition metal oxides, in which some nickel is substituted with other transition metals such as manganese, cobalt and the like, were suggested. Although the nickel-based lithium transition metal oxide substituted with the metals has advantages such as relatively excellent cycle characteristics and capacity characteristics, there are still unresolved problems such as dramatic deterioration in cycle characteristics after extended use and stability problems during high-temperature storage.

In addition, mobile devices have been continuously reduced in weight and miniaturized, and, at the same time, are being highly functionalized by providing a variety of functions. In addition, secondary batteries attract attention as a power source of electric vehicles (EVs), hybrid electric vehicles (HEVs) and the like proposed as a solution to address air pollution due to existing gasoline vehicles, diesel vehicles and the like. Accordingly, increase in use of secondary batteries is anticipated and thereby the above problems as well as problems regarding a great quantity, battery stability at a high potential and high-temperature storage characteristics are being stood out.

Therefore, there is an urgent need to develop technology which is suitable for high capacity secondary batteries and may solve high temperature stability problems.

DISCLOSURE

Technical Problem

Therefore, the present invention has been made to solve the above and other technical problems that have yet to be resolved.

As a result of a variety of extensive and intensive studies and experiments, the inventors of the present invention confirmed that, when an electrode assembly is manufactured using a cathode active material, which has a bimodal form, including a surface-treated lithium cobalt-based oxide and lithium nickel-based composite oxide, and an anode active material including carbon and a silicon oxide, a voltage area may be extended and discharge end voltage may be lowered, and thereby capacity may be maximized, and rolling density of a cathode active material is improved, and thereby capacity per volume is increased and high-temperature storage characteristics are also improved, thus completing the present invention.

Technical Solution

In accordance with one aspect of the present invention, provided is an electrode assembly including a cathode, an anode and a separator, wherein the cathode includes a lithium cobalt-based oxide, and a lithium nickel-based composite oxide forming a coating layer over a surface of the lithium nickel-based composite oxide by reacting with a fluorine-containing polymer, as a cathode active material, the anode includes carbon and a silicon oxide as an anode active material, an operating voltage is 2.50 V to 4.35 V, and the cathode active material has high rolling density by a bimodal form in which an average diameter of the cobalt-based oxide and an average diameter of the lithium nickel-based composite oxide are different.

As one specific embodiment, an average diameter of the lithium cobalt-based oxide may be 16 to 25 μm and the average diameter of the lithium nickel-based composite oxide may be 2 to 10 μm. On the other hand, an average diameter of the lithium cobalt-based oxide may be 2 to 10 μm and the average diameter of the lithium nickel-based composite oxide may be 16 to 25 μm.

FIG. 1 illustrates a partial schematic view of the cathode active material according to one embodiment of the present invention and FIG. 2 illustrates a scanning electron microscope (SEM) image of the cathode active material according to one embodiment of the present invention. Referring to the partial schematic view of FIG. 1, the cathode active material 100 has a bimodal form in which a lithium nickel-manganese-cobalt oxide 110 having a smaller average diameter fills in interstitial volume among a lithium cobalt oxide 120 having a larger average diameter.

In such a structure, it may be confirmed that a diameter of the lithium cobalt oxide 120 is three to four times larger than a diameter of the lithium nickel-manganese-cobalt oxide 110. However, the diameters are merely to exemplify the present invention and, on the contrary, the present invention naturally includes a case that the lithium cobalt oxide has a smaller average diameter and the lithium nickel-based composite oxide has a large average diameter.

Regarding this, inventors of the present invention confirmed that, when a lithium cobalt-based oxide, which has excellent cycle characteristics, and lithium nickel-based composite oxide, which is stable at high voltage and thereby has a high-potential operating range and, at the same time, excellent capacity characteristics, having different average diameters, are mixed, rolling density is improved and thereby capacity per volume is increased, and operating voltage is more extended to 2.50 V to 4.35 V, when compared to an existing operating voltage area of 3.0 V to 4.35 V, and discharge end voltage is lowered, and thereby capacity may be maximized, when compared to when each of the oxides is separately used or a mixture of cathode active materials having similar average diameters is used.

As one specific embodiment, a rolling density of the cathode active material according to the present invention using the lithium nickel-based oxide, which forms a coating layer over a surface thereof by reacting with a lithium cobalt oxide and a fluorine-containing polymer, may be particularly 3.8 to 4.0 g/cc. Accordingly, it can be confirmed that the rolling density of the cathode active material according to the present invention is dramatically increased, when compared to rolling density of 3.6 to 3.7 g/cc of a cathode active material, in which a lithium cobalt oxide and a lithium nickel-based oxide having similar average diameters are mixed and which does not have a bimodal form.

As one specific embodiment, the lithium nickel-based composite oxide may be a lithium nickel-manganese-cobalt composite oxide represented by Formula 1 below.

$$Li_{1+x}Ni_aMn_bCo_{1-(a+b)}O_2 \quad (1)$$

wherein $-0.2 \leq x \leq 0.2$, $0.5 \leq a \leq 0.6$, and $0.2 \leq b \leq 0.3$.

As described above, the lithium transition metal oxide, in which some nickel is substituted with other transition metals such as manganese, cobalt and the like, has relatively high capacity and exhibits high cycle stability.

Here, a large amount of gas may be generated during cycling and thus, to address this problem, the lithium nickel-based composite oxide according to the present invention includes a coating layer formed by reacting with a fluorine-containing polymer over a surface thereof.

Here, the fluorine-containing polymer may be, for example, PVdF or PVdF-HFP.

Referring to FIG. 1 again, a coating layer 130 generated through a reaction with a fluorine-containing polymer is formed over a surface of the lithium nickel-manganese-cobalt oxide 110.

As one specific embodiment, the amount of fluorine of the coating layer may be 0.001 to 3000 ppm, more particularly 1000 to 2000 ppm, based on based on the total amount of the lithium nickel-based composite oxide.

When the coating layer includes 3000 ppm or more of fluorine, or is coated to a thickness exceeding the coating thickness, the amount of the lithium nickel-based composite oxide is relatively reduced and thereby a desired amount is not obtained. On the other hand, when the amount of fluorine or metal elements is excessively low or a coating thickness is too thin, gas generation suppression effect may not be obtained.

As one specific embodiment, the coating layer may be formed over a whole surface of the lithium nickel-based composite oxide through wet coating or dry coating.

The wet coating or the dry coating is previously known in the art and thus detailed descriptions thereof are omitted in the specification.

As one specific embodiment, the lithium nickel-based composite oxide may be included in an amount of particularly 10 to 50 wt %, more particularly 20 to 40 wt %, based on the total amount of the cathode active material.

When the lithium nickel-based composite oxide is included in an amount of less than 10 wt %, excellent high-voltage characteristics and high-temperature storage characteristics may not be obtained. On the other hand, when the amount of the lithium nickel-based composite oxide exceeds 50 wt %, the amount of the lithium cobalt-based oxide is relatively reduced, and thereby it is difficult to obtain characteristics such as excellent cycle characteristics and capacity is reduced.

To further improve high-voltage and high-temperature storage characteristics, as one specific embodiment, a surface of the lithium cobalt-based oxide according to the invention may be coated with alumina ($Al_2O_3$).

Referring to FIG. 1, a coating layer 140 of $Al_2O_3$ is formed over a surface of the lithium cobalt oxide 120.

Here, the amount of Al may be particularly 0.001 to 2000 ppm, more particularly 350 to 500 ppm, based on the total amount of the lithium cobalt-based oxide.

A coating thickness of $Al_2O_3$ may be, for example, 0.5 nm to 2 nm.

When Al is included in an amount of 2000 ppm or more, or $Al_2O_3$ is coated in a thickness of the coating thickness or more, the amount of the lithium cobalt-based oxide is relatively decreased and thereby desired capacity may not be obtained. On the other hand, when the amount of Al is excessively low or a coating thickness thereof is too thin, desired improvement in high-temperature storage characteristics may not be obtained.

As one specific embodiment, $Al_2O_3$ may be coated over a whole surface of the lithium cobalt-based oxide through wet coating.

The wet coating is known in the art and thus detailed descriptions thereof are omitted.

Furthermore, to improve stability, electronical conductivity, and rate characteristics of the cathode structure, as one specific embodiment, the lithium cobalt-based oxide may be doped with heterometallic elements. Here, the doped lithium cobalt-based oxide may be represented by Formula 2 below.

$$Li(Co_{(1-a)}M_a)O_2 \qquad (2)$$

wherein $0.1 \leq a \leq 0.2$; and

M is at least one element selected from the group consisting of Mg, K, Na, Ca, Si, Ti, Zr, Sn, Y, Sr, Mo, and Mn.

For example, M may be particularly Mg and/or Ti, more particularly Mg and Ti. Inventors of the present invention confirmed that, when Mg is doped, the cathode structure is more stable, and, when Ti is doped, electronical conductivity and rate characteristics are improved.

To maximize capacity increase in a battery having lowered discharge voltage, the present invention uses an anode active material including carbon and a silicon oxide, in addition to the above cathode active material.

As one specific embodiment, the silicon oxide included in the anode active material may be represented by Formula 3 below.

$$SiO_{1-x} \qquad (3)$$

wherein $-0.5 \leq x \leq 0.5$.

The silicon oxide represented by Formula 3 may be obtained by vacuum heat-treating after mixing Si and $SiO_2$ in a specific molar ratio.

As one specific embodiment, the silicon oxide may be included in an amount of 3 to 20 wt %, more particularly 10 to 20 wt %, based on the total amount of the anode active material.

When the amount of the silicon oxide exceeds 20 wt % based on the total weight of the anode active material, the volume of $SiO_{1-x}$ is excessively expanded during battery cycling, and thereby cycle characteristics are deteriorated and swelling is intensified. On the other hand, when the amount of the silicon oxide is less than 3 wt %, it is difficult to provide desired capacity.

In addition, as one specific embodiment, the present invention may use an SRS separator as the separator to improve battery stability according to extension of an operating voltage.

The SRS separator as an organic/inorganic composite porous separator is prepared using inorganic particles and a binder polymer as active layer ingredients on a polyolefin-based separator substrate. Here, the SRS separator has a pore structure included in the separator substrate and a uniform pore structure formed by interstitial volume among inorganic particles as active layer ingredients.

When the organic/inorganic composite porous separator is used, there is an advantage that increase in a battery thickness according to swelling during a formation process may be suppressed. In addition, when a polymer which may be gelated as a binder polymer ingredient is used during swelling of a liquid electrolyte, the SRS separator may also be used as an electrolyte at the same time.

In addition, the organic/inorganic composite porous separator has a plurality of uniform pore structures in all of an active layer and a polyolefin-based separator substrate and thereby lithium ions may smoothly transport through the pores, and a large amount of electrolytes are filled therein and thereby a high swelling ratio may be exhibited. Accordingly, battery performance also may be improved.

The organic/inorganic composite porous separator composed of the inorganic particles and the binder polymer does not exhibit high-temperature contraction due to thermal resistance of inorganic particles. Therefore, although, in an electrochemical device using the organic/inorganic composite porous film as a separator, a separator in a battery due to excessive internal or external factors such as high temperature, overcharge, external shock and the like bursts, it is difficult that both electrodes are completely short-circuited by an organic/inorganic composite porous active layer and, if short-circuit occurs, expansion of the short-circuit area may be prevented. Accordingly, battery stability may be improved.

Since the organic/inorganic composite porous separator is formed by directly coating on the polyolefin-based separator, pores of the polyolefin-based separator substrate surface and an active layer are anchored, and thereby the active layer and the porous substrate are firmly bonded. Accordingly, mechanical properties such as brittling and the like may be improved, and interface adhesive strength between the polyolefin-based separator substrate and the active layer is improved and thus interface resistance may be reduced. Practically, it can be confirmed that, in the organic/inorganic composite porous separator, the formed organic/inorganic composite active layer and the porous substrate are organically bonded, a pore structure present in the porous substrate is not affected by the active layer and the structure thereof is maintained, and, at same time, a uniform pore structure is formed in the active layer due to inorganic particles. The pore structure is filled with a liquid electrolyte, which is subsequently injected, and, as such, interface resistance between inorganic particles or between inorganic particles and a binder polymer is dramatically reduced.

The organic/inorganic composite porous separator may exhibit excellent adhesive strength characteristics by controlling the amounts of inorganic particles and a binder polymer as active layer ingredients of a separator, and thereby a battery assembly process may be easily carried out.

In the organic/inorganic composite porous separator, one of active layer ingredients formed in some pores of a surface and/or a substrate of the polyolefin-based separator substrate is inorganic particles which are conventionally known in the art. The inorganic particles may form empty space among inorganic particles and thereby may form micro pores and maintain a physical shape as a spacer. In addition, physical characteristics of the inorganic particles are not generally changed at a temperature of 200° C. or more and, as such, a formed organic/inorganic composite porous film has excellent thermal resistance.

The inorganic particles are not specifically limited as long as inorganic particles are electrochemically stable. That is, the inorganic particles used in the present invention are specifically limited as long as oxidation and reduction reactions do not occur in an operating voltage range (namely, 0 to 5 V based on Li/Li+) of a used battery. In particular, when inorganic particles having ion delivery ability are used, battery performance may be improved by raising ionic conductivity in an electrochemical device. Therefore, inorganic particles having high ionic conductivity, which is possible, are preferable. In addition, when the inorganic particles have high density, it is difficult to disperse during coating but also, when a battery is manufactured, the weight of the battery is increased. Therefore, inorganic particles having low density, which is possible, are preferable. In addition, when the inorganic particles have a high dielectric constant, a dissociation degree of an electrolyte salt in a liquid electrolyte, namely, a lithium salt, is increased and thereby ionic conductivity of an electrolyte may be improved.

Due to reasons described above, as the inorganic particles, high dielectric constant inorganic particles having a dielectric constant of 5 or more, preferably 10 or more, inorganic particles having piezoelectricity, inorganic particles having lithium ion transfer ability, and a mixture thereof are preferable.

The piezoelectric inorganic particles mean a material which is a nonconductor at normal pressure but, when a certain pressure is applied thereto, an internal structure is changed and thereby has conductivity. In particular, the piezoelectric inorganic particles exhibit high dielectric constant characteristics having a dielectric constant of 100 or more and have a potential difference between both faces in which one face is charged by a cathode and the other face is charged by an anode by electric charge generated when particles are tensioned or compressed by a certain pressure.

When inorganic particles having the above characteristics are used as a porous active layer ingredient, internal short-circuit in both electrodes due to external shock such as local crush, nail and the like may occur, and thereby a cathode and an anode may not directly contact one another due to inorganic particles coated on a separator and potential differences among particles may occur due to piezoelectricity of inorganic particles. Accordingly, electron migration, namely, fine current flow, is achieved between both electrodes and thereby battery voltage is gradually reduced, and, accordingly, stability may be improved.

The inorganic particles having piezoelectricity may be, for example, $BaTiO_3$, $Pb(Zr,Ti)O_3$ (PZT), $Pb_{1-x}La_xZr_{1-y}Ti_yO_3$ (PLZT), $Pb(Mg_3Nb_{2/3})O_3$—$PbTiO_3$ (PMN-PT) hafnia ($HfO_2$) or a mixture thereof, but the present invention is not limited thereto.

The inorganic particles having the lithium ion transfer ability indicate inorganic particles which contain lithium elements, do not save lithium, and transport lithium ions. The inorganic particles having the lithium ion transfer ability lithium may transfer and transport ions by a defect present in a particle structure, and thereby lithium ionic conductivity in a battery is improved, and, accordingly, battery performance may be improved.

The inorganic particles having the lithium ion transfer ability may be, for example, lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), (LiAlTiP)xOy-based glass (where $0<x<4$ and $0<y<13$) such as $14Li_2O-9Al_2O_3-38TiO_2-39P_2O_5$ and the like, lithium lanthanum titanate ($Li_xLa_yTiO_3$, where $0<x<2$ and $0<y<3$), lithium germanium thio phosphate ($Li_xGe_yP_zS_w$, where $0<x<4$, $0<y<1$, $0<z<1$, and $0<w<5$) such as $Li_{3.25}Ge_{0.25}P_{0.75}S_4$ and the like, lithium nitride ($Li_xN_y$, where $0<x<4$ and $0<y<2$) such as $Li_3N$ and the like, $SiS_2$-based glass ($Li_xSi_yS_z$, where $0<x<3$, $0<y<2$, and $0<z<4$) such as $Li_3PO_4$—$Li_2S$—$SiS_2$ and the like, $P_2S_5$-based glass ($Li_xP_yS_z$, where $0<x<3$, $0<y<3$, and $0<z<7$) LiI—$Li_2S$—$P_2S_5$ and the like, or a mixture thereof, but the present invention is not limited thereto.

In addition, the inorganic particles having a dielectric constant of 5 or more may be, for example, $SrTiO_3$, $SnO_2$, $CeO_2$, $MgO$, $NiO$, $CaO$, $ZnO$, $ZrO_2$, $Y_2O_3$, $Al_2O_3$, $TiO_2$, SiC or a mixture thereof, but the present invention is not limited thereto. When the high dielectric constant inorganic particles, the inorganic particles having piezoelectricity, and the inorganic particles having lithium ion transfer ability, which have been described above, are mixed, synergistic effects thereof may be doubled.

The organic/inorganic composite porous separator according to the present invention may form pores in a separator substrate and a pore structure of an active layer by controlling the size of inorganic particles being an ingredient of an active layer of a separator substrate, the amount of inorganic particles, and compositions of inorganic particles and a binder polymer. In addition, the sizes of the pores and porosity may be controlled.

The sizes of the inorganic particles, which are not limited, are preferably 0.001 to 10 μm to form a film having uniform thickness and provide proper porosity. When the sizes of the inorganic particles is less than 0.001 μm, dispersibility is deteriorated and thereby it is difficult to control physical properties of the organic/inorganic composite porous separator. On the other hand, when the average size of the inorganic particles exceeds 10 μm, the thickness of the organic/inorganic composite porous separator prepared in an identical solid content is increased and thereby mechanical properties are deteriorated. In addition, due to excessively large pore size, likelihood of internal short-circuit during battery charge/discharge is increased.

Although the amount of the inorganic particles is not specifically limited, the amount of the inorganic particles is preferably 50 to 99 wt %, more preferably 60 to 95 wt % based on a 100 wt % of a mixture of the inorganic particles and the binder polymer constituting the organic/inorganic composite porous separator. When the amount of the inorganic particles is less than 50 wt %, the amount of the polymer is excessively high and thereby pore sizes and porosity are reduced due to reduction of interstitial volume formed among inorganic particles, and, accordingly, battery performance may be deteriorated. On the contrary, when the amount of the inorganic particles exceeds 99 wt %, the amount of the polymer is too low and thereby adhesive strength among inorganic matters is reduced, and, accordingly, mechanical properties of a final organic/inorganic composite porous separator are deteriorated.

In the organic/inorganic composite porous separator according to the present invention, the other ingredient of active layer ingredients formed in some pores of a surface of the polyolefin-based separator substrate and/or the substrate is a polymer which is conventionally used in the art. In particular, an ingredient having low glass transition temperature (Tg) may be used and the low glass transition temperature (Tg) is preferably −200 to 200° C. By using the above temperature range, mechanical properties such as flexibility, elasticity and the like of a final film may be improved. The polymer faithfully plays a role as a binder to connect and stably fix inorganic particles and spaces among particles, and inorganic particles and a surface of a separator substrate or some pores of a separator, and thereby deterioration of mechanical properties of a finally prepared organic/inorganic composite porous separator may be prevented.

In addition, although ionic conductivity of the binder polymer is not essentially required, when a polymer having ionic conductivity is used, performance of an electrochemical device may be further improved. Therefore, a binder polymer having high dielectric constant, which is possible, is preferable.

Practically, since a dissociation degree of a salt in an electrolyte depends on a dielectric constant of an electrolyte solvent, a salt dissociation degree in the electrolyte according to the present invention may be improved with increasing dielectric constant of the polymer. The dielectric constant of the polymer may be used in a range of 1.0 to 100 (measurement frequency=1 kHz), preferably 10 or more.

In addition to the described functions, the binder polymer is gelled during liquid electrolyte swelling and thereby may exhibit a high electrolyte swelling ratio (degree of swelling). Practically, when the binder polymer is a polymer having an excellent electrolyte swelling ratio, an electrolyte injected after battery assembly permeates into a polymer and the polymer having an absorbed electrolyte has electrolyte ionic conductivity. Accordingly, when compared to the prior organic/inorganic composite electrolytes, performance of an electrochemical device may be improved. In addition, when compared to an existing hydrophobic polyolefin-based separator, a wetting property of an electrolyte for batteries may be improved and a polar electrolyte, which was difficult to use, may also be employed. Additionally, when the polymer swelled in an electrolyte is a polymer which may be gelled, the polymer reacts with subsequently injected electrolyte and thereby is gelled, and, accordingly, a gel-type organic/inorganic composite electrolyte may be formed. The formed electrolyte may be easily prepared and exhibits high ionic conductivity and an electrolyte swelling ratio, when compared to the prior gel-type electrolyte. Accordingly, battery performance may be improved. Therefore, if possible, a solubility parameter of a polymer is preferably 15 to 45 $MPa^{1/2}$, more preferably 15 to 25 $MPa^{1/2}$ and 30 to 45 $MPa^{1/2}$. When a solubility parameter is less than 15 $MPa^{1/2}$ and greater than 45 $MPa^{1/2}$, it is difficult to be swelled by a conventional liquid electrolyte.

An available binder polymer may be, for example, polyvinylidene fluoride-co-hexafluoropropylene, polyvinylidene fluoride-cotrichloroethylene, polymethylmethacrylate, polyacrylonitrile, polyvinylpyrrolidone, polyvinylacetate, polyethylene-co-vinyl acetate, polyethylene oxide, celluloseacetate, cellulose acetate butyrate, cellulose acetate propionate, cyanoethylpullulan, cyanoethylpolyvinylalcohol, cyanoethylcellulose, cyanoethylsucrose, pullulan, carboxylmethyl cellulose, acrylonitrile-styrene-butadiene copolymer, polyimide or a mixture thereof, but the present invention is not limited thereto. In addition, any materials having characteristics described above may be used separately or as a mixture.

A composition ratio of inorganic particles and a binder polymer as the active layer ingredient is not greatly limited and may be controlled in a range of 10:90 to 99:1 wt %, preferably 80:20 to 99:1 wt %. When the composition ratio is less than 10:90 wt %, the amount of polymer is excessively increased and thereby pore sizes and porosity are reduced due to reduction of interstitial volume formed among inorganic particles, and, accordingly, final battery performance is deteriorated. On the contrary, when the composition ratio exceeds 99:1 wt %, the amount of a polymer is too low and thereby adhesive strength among inorganic matters is weakened, and, accordingly, mechanical properties of a final organic/inorganic composite porous separator may be deteriorated.

The active layer of the organic/inorganic composite porous separator may include other conventionally known additives, in addition to the inorganic particles and the polymer described above.

In the organic/inorganic composite porous separator, the substrate coated with the mixture of the inorganic particles and the binder polymer as ingredients of the active layer may be, for example, a polyolefin-based separator conventionally used in the art. The polyolefin-based separator ingredient may be, for example, high-density polyethylene, linear low-density polyethylene, low-density polyethylene, ultra-high molecular weight polyethylene, polypropylene, derivatives thereof, or the like.

The thickness of the polyolefin-based separator substrate, which is not greatly limited, is preferably 1 to 100 μm, more preferably 5 to 50 μm. When the thickness of the polyolefin-based separator substrate is less than 1 μm, it is difficult to maintain mechanical properties. On the other hand, when the thickness of the polyolefin-based separator substrate exceeds 100 μm, the polyolefin-based separator substrate may function as a resistance layer.

Pore sizes and porosity of the polyolefin-based separator substrate are not specifically limited. Preferably, the porosity is 10 to 95% and the pore sizes (diameters) are 0.1 to 50 μm. When the pore sizes are less than 0.1 μm and the porosity is less than 10%, the polyolefin-based separator substrate may function as a resistance layer. On the other hand, when the pore sizes exceed 50 μm and the porosity exceeds 95%, it is difficult to maintain mechanical properties. In addition, the polyolefin-based separator substrate may be a textile or membrane type.

As described above, the organic/inorganic composite porous separator of the present invention, which is formed by coating the mixture of the inorganic particles and the binder polymer over the polyolefin separator substrate, includes a pore portion in the separator substrate. In addition, due to interstitial volume among inorganic particles formed over the substrate, the base and the active layer form a pore structure. The pore sizes and porosity of the organic/inorganic composite porous separator mainly depend on the sizes of inorganic particles, and thereby, when inorganic particles having diameters of 1 μm or less are used, formed pores also have diameters of 1 μm or less. Like this, the pore structure is filled with a subsequently injected electrolyte and the injected electrolyte transfers ions. Therefore, pore sizes and porosity are important factors to control ionic conductivity of the organic/inorganic composite porous separator.

The thickness of the active layer, in which a pore structure is formed by coating the mixture over the polyolefin separator substrate, is not specifically limited and is preferably 0.01 to 100 μm. In addition, a pore size of the active layer is preferably 0.001 to 10 μm and a porosity thereof is preferably 5 to 95%, but the present invention is not limited thereto.

A pore size of the organic/inorganic composite porous separator is preferably 0.001 to 10 μm and a porosity thereof is preferably 5 to 95%. In addition, the thickness of the organic/inorganic composite porous separator is not specifically limited and may be controlled considering battery performance. The thickness of the organic/inorganic composite porous separator is preferably 1 to 100 μm, more preferably 1 to 30 μm.

The other ingredients of the electrode assembly according to the present invention will be described below.

The cathode, for example, may be prepared by drying after coating a mixture of the cathode active material, a conductive material and a binder over a cathode collector. In this case, as desired, the mixture may further include a filler.

The cathode current collector is generally fabricated to a thickness of 3 to 500 μm.

The cathode current collector is not particularly limited so long as it does not cause chemical changes in the fabricated battery and has high conductivity. For example, the cathode current collector may be made of stainless steel, aluminum, nickel, titanium, sintered carbon, and aluminum or stainless steel surface-treated with carbon, nickel, titanium silver or the like. The current collector may have fine irregularities at a surface thereof to increase adhesion between the cathode active material and the cathode current collector and may be used in any of various forms including films, sheets, foils, nets, porous structures, foams, and non-woven fabrics.

The conductive material is typically added in an amount of 1 to 50 wt % based on the total weight of the mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an electrode active material and the conductive material and in binding of the electrode active material to an electrode current collector. The binder is typically added in an amount of 1 to 50 wt % based on the total weight of the mixture including the cathode active material. Examples of the binder include, without being limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The anode may be manufactured by coating, drying and pressing the anode active material on an anode current collector. In some cases, the above-described conductive material, binder, filler and the like may be selectively further coated on the anode current collector.

The anode current collector is typically fabricated to a thickness of 3 to 500 μm.

The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. As in the cathode current collector, the anode current collector may have fine irregularities at a surface thereof to enhance adhesion between the anode current collector and the anode active material. In addition, the anode current collector may be used in various forms including films, sheets, foils, nets, porous structures, foams, and non-woven fabrics.

The present invention also provides a lithium secondary battery including the electrode assembly.

The lithium secondary battery includes the electrode assembly and a lithium salt-containing non-aqueous electrolyte.

A lithium salt-containing non-aqueous electrolyte is composed of a non-aqueous electrolyte and a lithium salt. As the non-aqueous electrolyte, a non-aqueous inorganic solvent, an organic solid electrolyte, or an inorganic solid electrolyte may be used, but the present is not limited thereto.

For example, the non-aqueous organic solvent may be an aprotic organic solvent such as N-methyl-2-pyrrolidone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), or the like.

As one preferable embodiment, a lithium salt such as $LiPF_6$, $LiClO_4$, $LiBF_4$, $LiN(SO_2CF_3)_2$ and the like may be added to a mixture of cyclic carbonate of EC or PC as a high dielectric solvent and linear carbonate of DEC, DMC or EMC as a low viscosity solvent, to prepare a lithium salt-containing non-aqueous electrolyte.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a partial schematic view of a cathode active material according to one embodiment of the present invention;

FIG. 2 is a scanning electron microscope (SEM) image of a cathode active material according to one embodiment of the present invention;

FIG. 3 is a graph comparing capacities of lithium secondary batteries according to pressure of a cathode active material according to Experimental Example 1, and Comparative Examples 1 and 2; and FIG. 4 is a graph comparing temperature changes and high-temperature storage characteristics of lithium secondary batteries according to Experimental Example 2, and Comparative Example 3.

MODE FOR INVENTION

Now, the present invention will be described in more detail with reference to the accompanying drawings. These examples are provided for illustrative purposes only and should not be construed as limiting the scope and spirit of the present invention.

Example 1

Manufacture of Cathode $LiNi_{0.55}Mn_{0.30}CO_{0.15}O_2$ and PVdF were mixed and then heat-treated for nine hours in a temperature range of 150 to 600° C. to prepare $LiNi_{0.55}Mn_{0.30}CO_{0.15}O_2$, over which an LiF film is formed.

As a single phase structure, $LiCoO_2$ having $D_{50}$ of approximately 16 to 25 μm and $LiNi_{0.55}Mn_{0.30}Co_{0.15}O_2$ having $D_{50}$ of approximately 2 to 10 μm were mixed in a ratio of 70:30, to prepare a mixed cathode material.

The mixed cathode active material, Denka black as a conductive material, and polyvinylidene fluoride as a binder were mixed in a weight ratio of 96:2:2 and then N-methyl-pyrrolidone (NMP) was added thereto, to prepare a slurry. The resulting cathode slurry was coated on an aluminum collector and then dried in a 120° C. vacuum oven, to prepare a cathode.

Manufacture of Anode

After mixing Si and $SiO_2$ in a molar ratio of 1:1, the resulting mixture was vacuum heat-treated at 800° C., to prepare $SiO_{1-x}$ (where x is 0). $SiO_{1-x}$ (available from Shinetsu), MAG-V2 (available from Hitachi), and AGM01 (available from Mitsubishi) were mixed in a ratio of 5:10.6:84.4, to prepare a mixed anode material.

The mixed anode material, Super P (or DB) as a conductive material, SBR as a binder and CMC as a thickening agent were mixed in a ratio (weight ratio) of 96.55:0.7:1.75:1, and then were dispersed. Subsequently, the resulting mixture was coated on copper foil to prepare an anode.

Manufacture of Separator

A polyvinylidene fluoride-hexafluoro propylene (PVdF-HFP) copolymer was added to acetone in approximately 8.5 wt % and then dissolved for approximately 12 hours or more at 50° C., to prepare a polymer solution. To the polymer solution, an $Al_2O_3$ powder was added in a ratio of $Al_2O_3$:PVdF-HFP of 90:10 (wt %), and then ball-milled for 12 hours or more, to prepare a slurry. The prepared slurry was coated over a polyethylene separator (porosity: 45%) having a thickness of approximately 7 to 9 μm through dip coating. After controlling thickness of the coating to approximately 4 to 5 μm, a pore size and a porosity of an active layer coated over the polyethylene separator were measured with a porosimeter. As a result, an organic/inorganic composite porous separator having a pore size of 0.5 μm and a porosity of 58% was prepared.

Manufacture of Lithium Secondary Battery

An electrode assembly was manufactured by interposing the separator between the prepared cathode and anode. After accommodating the electrode assembly in an aluminum can or an aluminum pouch, electrode leads were connected thereto. Subsequently, a carbonate based composite solution including 1 M $LiPF_6$ as an electrolyte was injected thereinto. The resulting battery case was sealed, thereby completing fabrication of a lithium secondary battery.

Comparative Example 1

A cathode material, anode material, and lithium secondary battery were manufactured in the same manner as in Example 1, except that, only $LiCoO_2$, instead of the mixed cathode, was used, and a mixed anode mixture of $SiO_{1-x}$ (available from Shinetsu), MAG-V2 (available from Hitachi) and AGM01 (available from Mitsubishi) mixed in a ratio of 3:10.8:86.2 was used.

Comparative Example 2

A cathode material, anode material, and lithium secondary battery were manufactured in the same manner as in Example 1, except that, only $LiCoO_2$, instead of the mixed cathode, was used.

Experimental Example 1

To confirm effects due to use of the mixed cathode material, the capacities of the batteries manufactured according to Example 1, and Comparative Examples 1 and 2 were measured according to operating voltage. Results are summarized in FIG. 3 below.

As confirmed in FIG. 3, when the mixed cathode material of the lithium cobalt-based oxide and the lithium nickel-manganese-cobalt oxide having a predetermined composition ratio was used as a cathode material and the carbon-based material including $SiO_{1-x}$ (x=0) in a constant amount was used, battery capacity was improved. In addition, when discharge voltage was lowered to 2.5 V, capacity increase range was improved, when compared to that at 3.0 V.

Example 2

A cathode material, anode material, and lithium secondary battery were manufactured in the same manner as in Example 1, except that, in Example 1, Mg (1000 ppm) and Ti (1000 ppm) are doped, and $LiCoO_2$, a surface of which was coated with $Al_2O_3$ (Al: 400 ppm), was used.

Comparative Example 3

A cathode material, anode material, and lithium secondary battery were manufactured in the same manner as in Example 1, except that, in Example 1, Mg (1000 ppm) and Ti (1000 ppm) are doped, and $LiCoO_2$, a surface of which was coated with $Al_2O_3$ (Al: 400 ppm), and $LiNi_{0.55}Mn_{0.30}Co_{0.15}O_2$, a surface of which was not coated, were used.

Experimental Example 2

To confirm effects according to NMC surface coating, a thickness change degree, which is caused by battery swelling according to temperature change, of the battery manufactured according to each of Example 2 and Comparative Example 3 was compared. Results are shown in FIG. 4 below.

As confirmed in FIG. 4, it can be confirmed that, the battery using the mixed cathode material including the lithium nickel-manganese-cobalt oxide, over which a LiF surface film is formed, exhibits excellent high-temperature storage characteristics, when compared to the battery using the mixed cathode material including the lithium nickel-manganese-cobalt oxide, over which a LiF surface film is not formed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, an electrode assembly according to the present invention includes a cathode including a lithium cobalt-based oxide, and a lithium nickel-based composite oxide forming a coating layer on a surface of the lithium nickel-based composite oxide by reacting with a fluorine-containing polymer, as a cathode active material, and an anode including carbon and a silicon oxide as an anode active material, and thereby a voltage area may be extended and discharge end voltage may be lowered, and, accordingly, capacity may be maximized. In addition, the cathode active material has a bimodal form in which an average diameter of the cobalt-based oxide and an average diameter of the lithium nickel-based composite oxide are different, and thereby the cathode active material has high rolling density, and, accordingly, capacity per volume may also be increased.

In addition, the electrode assembly according to the present invention may have high-temperature storage characteristics and improved stability at high voltage by surface-treating the lithium cobalt-based oxide and the lithium nickel-based composite oxide constituting the cathode active material.

The invention claimed is:

1. An electrode assembly comprising a cathode, an anode and a separator,
  wherein the cathode comprises a cathode active material, which comprises:
    a lithium cobalt-based oxide having a layer comprising $Al_2O_3$ present on a surface thereof, and
    a lithium nickel-based composite oxide having a LiF surface film present on a surface thereof,
    wherein the LiF surface film is derived from the reaction between the lithium nickel-based composite oxide and a fluorine containing polymer at the surface of the lithium nickel-based composite oxide,
  wherein the anode comprises an anode active material, which comprises:
    carbon, and
    a silicon oxide,
  wherein the electrode assembly has an operating voltage of 2.50 V to 4.35 V, and
  wherein the cathode active material has density in a bimodal form in which a $D_{50}$ diameter of the lithium cobalt-based oxide and a $D_{50}$ diameter of the lithium nickel-based composite oxide are different.

2. The electrode assembly according to claim 1, wherein an average diameter of the lithium cobalt-based oxide is 16 to 25 μm, and an average diameter of the lithium nickel-based composite oxide is 2 to 10 μm.

3. The electrode assembly according to claim 1, wherein an average diameter of the lithium cobalt-based oxide is 2 to 10 μm, and an average diameter of the lithium nickel-based composite oxide is 16 to 25 μm.

4. The electrode assembly according to claim 1, wherein the lithium nickel-based composite oxide is a lithium nickel-manganese-cobalt composite oxide represented by Formula 1 below:

$$Li_{1+x}Ni_aMn_bCo_{1-(a+b)}O_2 \qquad (1)$$

wherein $-0.2 \leq x \leq 0.2$, $0.5 \leq a \leq 0.6$, and $0.2 \leq b \leq 0.3$.

5. The electrode assembly according to claim 1, wherein the fluorine-containing polymer is PVdF or PVdF-HFP.

6. The electrode assembly according to claim 1, wherein a fluorine amount in the fluorine-containing polymer coating layer is 0.001 to 3000 ppm based on a total amount of the lithium nickel-based composite oxide.

7. The electrode assembly according to claim 1, wherein the fluorine-containing polymer coating layer has a thickness of 0.5 nm to 2 nm.

8. The electrode assembly according to claim 1, wherein the fluorine-containing polymer coating layer is formed over a whole surface of the lithium nickel-based composite oxide.

9. The electrode assembly according to claim 1, wherein the fluorine-containing polymer coating is performed by wet coating or dry coating.

10. The electrode assembly according to claim 1, wherein the lithium nickel-based composite oxide is comprised in an amount of 10 to 50 wt % based on a total amount of the cathode active material.

11. The electrode assembly according to claim 1, wherein an amount of Al in the layer comprising $Al_2O_3$ is 0.001 to 2000 ppm based on a total amount of the lithium cobalt-based oxide.

12. The electrode assembly according to claim 11, wherein the layer comprising $Al_2O_3$ is coated to a thickness of 0.5 nm to 2 nm.

13. The electrode assembly according to claim 11, wherein the layer comprising $Al_2O_3$ is coated over a whole surface of the lithium cobalt-based oxide.

14. The electrode assembly according to claim 11, wherein the layer comprising $Al_2O_3$ is coated by wet coating.

15. The electrode assembly according to claim 1, wherein the lithium cobalt-based oxide is doped with a heterometallic element and represented by Formula 2 below:

$$Li(Co_{(1-a)}M_a)O_2 \qquad (2)$$

wherein $0.1 \leq a \leq 0.2$; and

M is at least one element selected from the group consisting of Mg, K, Na, Ca, Si, Ti, Zr, Sn, Y, Sr, Mo, and Mn.

16. The electrode assembly according to claim 15, wherein M is Mg and/or Ti.

17. The electrode assembly according to claim 1, wherein the cathode active material has a rolling density of 3.8 to 4.0 g/cc.

18. The electrode assembly according to claim 1, wherein the silicon oxide is represented by Formula 3 below:

$$SiO_{1-x} \qquad (3)$$

wherein $-0.5 \leq x \leq 0.5$.

19. The electrode assembly according to claim 1, wherein the silicon oxide is comprised in an amount of 3 to 20 wt % based on a total weight of the anode active material.

20. The electrode assembly according to claim 1, wherein the separator is an SRS separator.

21. A lithium secondary battery comprising the electrode assembly according to claim 1.

* * * * *